United States Patent Office 2,847,610
Patented Aug. 12, 1958

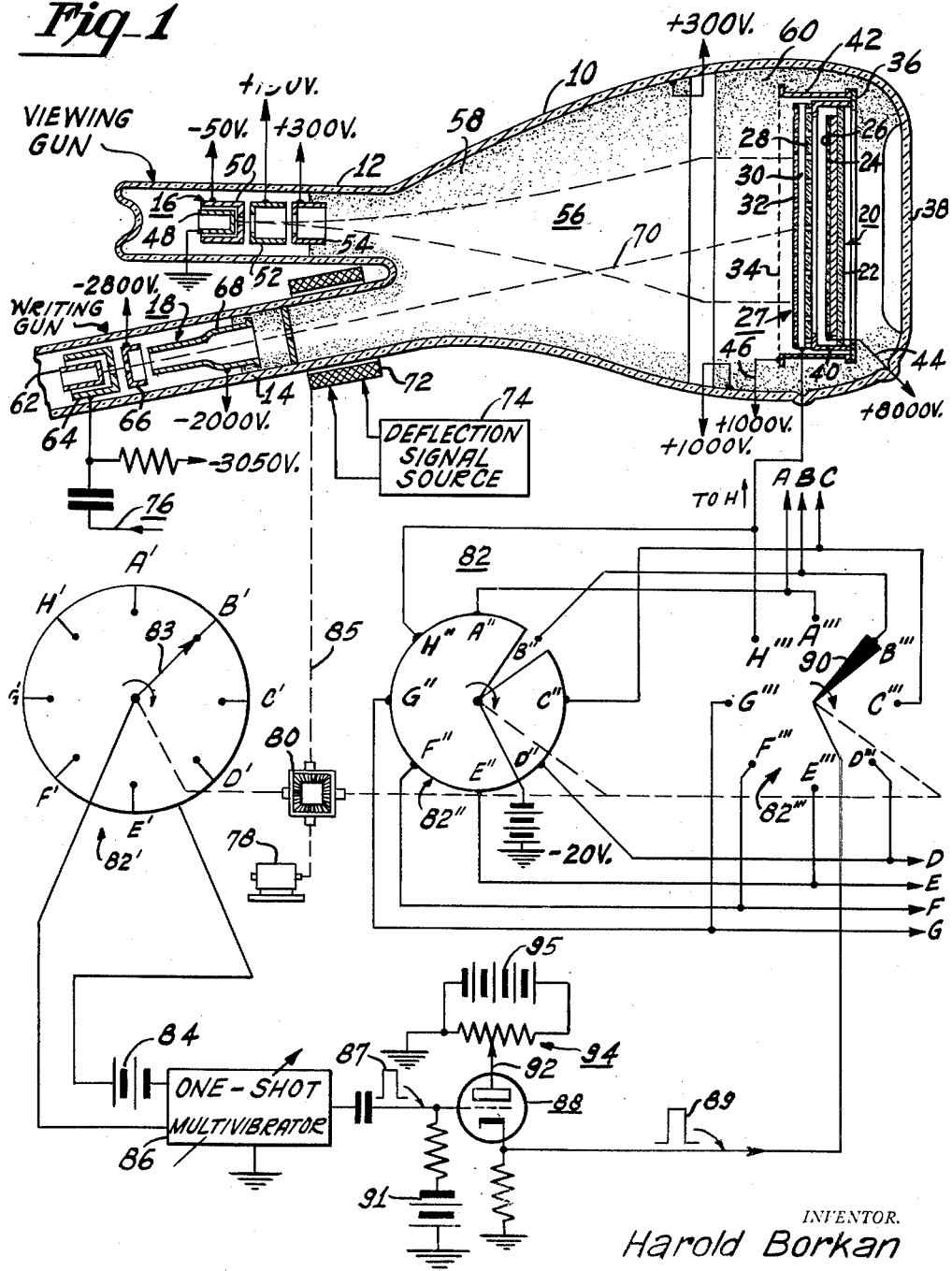

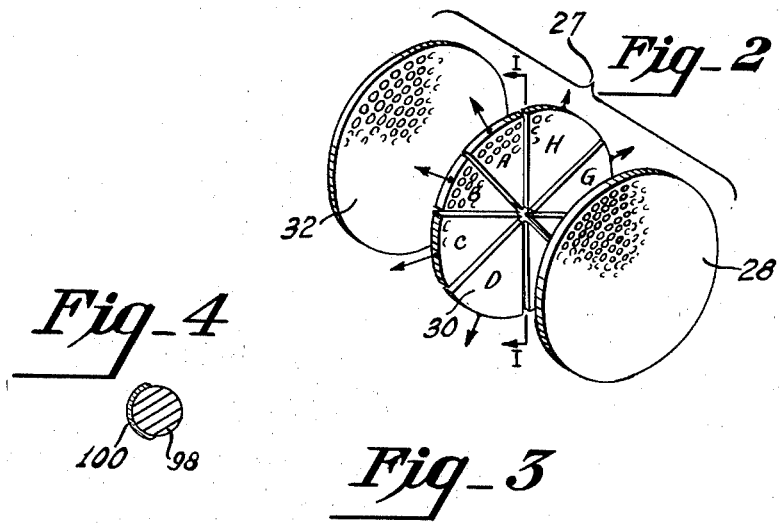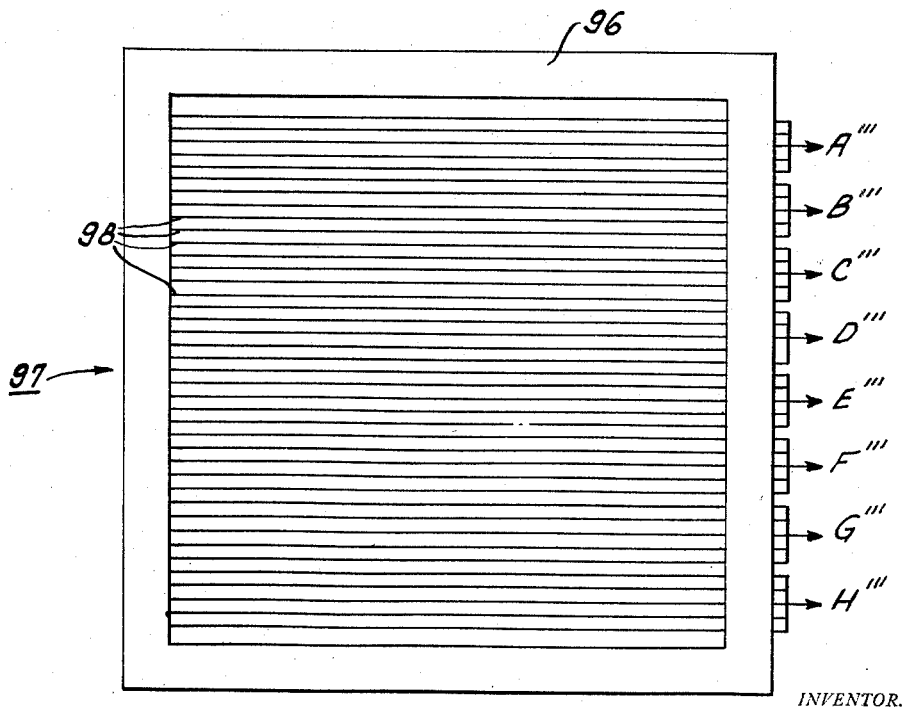

2,847,610

DIRECT-VIEW ELECTRICAL STORAGE TUBE AND ERASING SYSTEM THEREFOR

Harold Borkan, Franklin Township, Somerset County, N. J., assignor to Radio Corporation of America, a corporation of Delaware Application August 27, 1952, Serial No. 306,706

16 Claims. (Cl. 315—12)

This invention relates generally to electrical storage tubes and systems and more particularly to a novel direct-view type of storage tube and erasing system therefor especially adapted for use with systems wherein cyclical erasure of old signal intelligence slightly in advance of the replacing of old intelligence with new data is desired.

Presently known signal storage and display systems generally require one or more storage tubes in combination with a separate display tube. This arrangement is complicated, relatively expensive, and occupies an excessive amount of space which may be used to better advantage, particularly in airborne systems. It is desirable to combine the features of signal storage and display in a single tube.

Such a tube has been devised and often is referred to as the direct-view type storage tube or as the direct-view kinescope. The tube is especially suited for use in a number of different systems which include, by way of example, facsimile, private-line communication systems for transmitting flight data between ground and aircraft, airborne and other radar systems, omnirange navigation systems, etc.

In addition to combining the features of signal storage and display in a single tube, other advantages offered by systems employing the direct-view storage tube over presently known systems include greater picture brightness for a given anode voltage, a picture viewing time of several minutes substantially without picture decay, less flicker for a given bandwidth, and less extensive associated system circuitry.

Heretofore erasure of the bright display provided by the above tube has been achieved by suitably controlling potentials applied to certain electrodes within the tube. Also, the tube structure is such that the controlling of electrode potentials for erasure results in erasure over the entire area of the tube storage screen. While such an erasing technique may be satisfactory for erasing stored transients and various other charge patterns, the erasure requirements in radar and other systems are more exacting.

For example, after radar signals derived during one 360° radar azimuth scan have been stored and displayed, it is apparent that further writing without erasure is undesirable (assuming that scan-to-scan integration or moving target signal indication are not to be obtained) since some of the data written previously may correspond to an object or objects which have changed position and perhaps even moved out of the area serviced by the radar system. Also, it is undesirable at a given instant to completely erase the 360° scan since, in a number of radar systems, four to six seconds generally is required for displaying the next azimuth scan. If the writing process is interrupted for complete erasure, information normally derived during the erase interval is not stored and therefore is lost. Moreover, complete erasure at the end of a 360° scansion does not afford the advantage of noise discrimination by integrating the data last written. Thus since radar echo data derived from successive radar rangings progressively and cyclically is written and displayed, a cyclical method of erasure is required for maintaining an "up-to-date" store of radar data.

According to the present invention, the target assembly of the direct view tube is modified whereby a conductive screen in contact with a storage screen is divided into a plurality of coplanar units, each unit being insulated from units adjacent thereto. It will be seen that by instantaneously applying a suitable potential to only one section of the conductive screen different from the potential applied to remaining sections of the conductive screen, erasure of data stored on the portion of the storage screen in contact therewith may be achieved without affecting the data stored on the remaining sections. If, for example, a P. P. I. (plan position indication) type display is desired, the conductive screen may comprise a plurality of wedge-shaped sections. If a B-scan or other rectilinear presentation is required, rectangular screen sections may be employed. Thus as new signal intelligence is being written and stored on a given storage screen section, old information stored on an adjacent storage screen section (upon which new data next is to be written) may be erased. By erasing old data in accordance with the method outlined above an up-to-date pictorial display of radar or other information is provided.

An object of the invention is to provide a simplified system for storing and displaying desired information.

Another object of the invention is to provide an improved system for storing and displaying radar information.

Another object of the invention is to provide a system for cyclically and progressively erasing data stored and displayed in a direct-view type storage tube.

A further object of the invention is to provide a direct-view type electrical storage tube especially adapted for radar signal storage and display.

A still further object of the invention is to provide a system of erasure for use with a direct-view type storage tube in which "old" stored data is cyclically and progressively erased just prior to being replaced with "new" data.

The invention will be described in detail with reference to the accompanying drawings in which:

Figure 1 is a schematic diagram, partially in block form, of a novel direct-view type electrical storage tube shown in cross-section along section lines I—I of Figure 2 and an erasing system therefor, according to the invention;

Figure 2 is an exploded perspective view of a storage target assembly of the tube of Figure 1;

Figure 3 is a view of a storage target for use in the tube of Figure 1 and adapted for the presentation of rectilinear displays; and Figure 4 is a cross-sectional view of a portion of the storage target structure of Figure 3.

Similar reference characters are applied to similar elements throughout the drawings.

*Storage tube structure*

Figure 1 of the drawing shows a direct-view type storage tube consisting of an evacuated envelope 10 having two neck sections 12 and 14, respectively. Within the a second or "writing" electron gun 18 for providing a envelope neck 12 is an electron gun 16, hereinafter referred to as the "viewing gun." Within neck 14 is modulated beam of electrons which is accelerated into the envelope portion 10.

Mounted at the large end of the envelope portion 10 is a display assembly 20 including a glass support sheet 22 having a thin conductive film 24 disposed on one surface thereof and facing the electron guns. The film 24 may be formed, for example, of a metal or metallic compound such as tin oxide. On top of the conductive film 24 is a screen 26 formed from a phosphor material which fluoresces under electron bombardment.

Closely spaced in the direction towards the electron guns from the surface of the fluorescent screen 26 is a target assembly 27 which is shown in detail in Figure 2 and which includes an etched glass screen 28. In contact with one surface of the glass screen 28 is an electron permeable conductive screen 30 spaced several millimeters from the fluorescent screen 26 comprising a plurality of coplanar units (in the present example, wedge-shaped units A through H) each insulated from the other. A storage screen 32 is formed, by evaporation or some other convenient means, on the surface of the conductive screen 30 and comprises a dielectric insulating material such as a film of silica or magnesium fluoride of the order of several microns in thickness. Referring again to Figure 1, at a distance of the order of ten millimeters from the conductive coplanar sectioned screen 30 in the direction towards the electron guns is a fine metal mesh screen 34. Screen 34 may be a woven stainless steel mesh of the order of 230 mesh per inch while glass screen 28, sectioned conductive screen 30, and silica storage screen 32 may have a fineness of the order of 200 mesh per inch.

The display assembly 20 is mounted on a ring 36 of insulating material fixed within the envelope 10 and adjacent the tube face plate 38. Fixed to the ring 36 is an annular support ring 40 which supports intermediate its ends the glass support sheet 22 and across its open end the etched glass screen 28. Also mounted on the insulating ring 36 is a second annular metal support ring 42 across the ends of which is mounted the fine mesh screen 34. The conductive film 24 is insulated from the support ring 40 by the glass support sheet 22 and is connected by a lead 44 to a source of potential outside the envelope 10. The units of the "sectioned" mesh screen 30, during the tube operation, are selectively connected either to a potential of the order of —20 v. or to a positive potential for erasure as will be shown hereinafter. The mesh scren 34 is connected to a source of positive potential via lead 46.

The viewing gun 16 comprises a cathode electrode 48, a control electrode 50, a first accelerating electrode 52, and a second accelerating electrode 54 mounted successively along the axis of the gun 16 and toward the face plate 38. During tube operation these electrodes are maintained at appropriate voltages to form the electron emission from the cathode 48 into a wide beam or spray 56 of electrons. The inner surface of the envelope 10 has applied thereto a conductive coating 58 of colloidal graphite which coating may be maintained at the same positive potential as the second accelerating electrode 54. A second wall coating 60 extends from a point spaced from but adjacent coating 58 over the bulb wall enclosing the assemblies 20 and 27. This coating is at a potential different from that of coating 58 and thereby provides a collimating electron lens to align the electrons of the spray beam 56 in a direction axially with respect to the target assemblies.

The writing electron gun 18 comprises a cathode electrode 62, a control electrode 64 and, successively spaced toward the target, a first accelerating electrode 66 and a second accelerating lectrode 68. The wall coating 58 extends into the neck 14 of the writing gun and forms a third accelerating electrode for forming the electrons of gun 18 into a sharply defined and focussed beam 70.

The voltages applied to the electrodes of the tube of Figure 1 are illustrative of typical suitable operating voltages but should not be considered as limiting. For example, the fine mesh screen 34 may be operated at between 200 and 2,000 volts positive with respect to ground. The conductive coating 24 may be operated within a range of 2,000 to 20,000 volts positive relative to ground, while the potential applied to the sectioned conductive screen 30 may be varied between minus 100 volts to positive 2,000 volts relative to ground.

*Tube operation*

The operation of the direct-view storage tube is as follows. Assume that the entire surface of the dielectric storage screen 32 is at a uniform potential and that the potential of the sectioned conductive screen 30 is minus 20 volts. The storage screen 32, because of its thinness, is capacitively coupled thereto and assumes substantially the same potential. The electrons of the spray beam 56 are accelerated through the mesh screen 34 and enter a retarding field adjacent the surface of the storage insulator screen 32, the retarding field turning the electrons back to the screen 34 which serves as a collector therefor. The 8,000 volt potential applied to the conductive film 24 creates a field which tends to extend through the interstices of the storage screen 32, the screen 30, and the glass screen 28 to draw the electrons through the screen to bombard the fluorescent screen 26. The voltage applied to the sectioned screen 30 is adjusted to approximately minus 20 volts to just prevent any electrons from passing therethrough.

The writing gun 18 is then turned on and produces a sharply focussed electron beam 70 which may be deflected to scan over the surface of the storage insulator 32. The deflection may be accomplished by a deflection yoke 72 positioned about the neck section 14 and supplied with suitable deflection signals from a source 74. While the writing beam 70 is being deflected in the desired pattern, the beam 70 is modulated by videeo signals applied to the writing gun control grid 64 from an input circuit 76. The writing beam impinges on the mesh silica storage screen 32 at a voltage of approximately 3,000 volts which is between the first and second crossover points on the secondary emission curve thereof.

In this manner the writing beam initiates secondary emission from the silica surface such that more electrons leave the surface than impinge thereon. In those areas where the beam 70 strikes, the silica surface is driven positively from its potential of minus 20 volts toward viewing gun cathode potential or ground. No point on the insulator surface may be driven more positively than ground, however, since electrons from the spray beam 56 land continuously at that point and drive it back to ground potential or slightly negative with respect to ground. In the areas where the storage insulator 32 has been driven positively (from minus 20 volts), the positive field of the fluorescent screen 26 now penetrates to draw the low energy electrons of the spray beam 56 through the interstices of screens 32, 30, and 28 to strike the fluorescent screen 26 and cause luminescence. This luminescence appears only on areas of the fluorescent screen 26 corresponding to areas of the storage insulator 32 driven positively by secondary emission and hence corresponding to the image pattern of the writing beam.

This type of writing provides a visual display in which stored information appears as "white" on a dark background. Once a signal has been stored and displayed, theoretically it should remain stored and displayed indefinitely since the mode of tube operation described above is such that the low velocity spray beam 56 never completely discharges the charged areas of the storage screen 32. Actually, however, the charges established thereon gradually are dissipated by spurious ions produced within the tube.

While the above operation is directed to "white" writing on a dark background, the converse (i. e. dark writing on a white background) may be achieved. This may be done by initially setting the sectioned screen 32 to a potential of approximately two volts below viewing gun cathode potential or ground. With the viewing gun turned on, and the writing gun turned off, this potential may be more closely adjusted to a point where the positive field of the fluorescent screen 26 penetrates the storage screen 32 to draw low velocity electrons through to the fluorescent screen. The writing beam is then turned on with the cathode potential thereof adjusted so that the writing beam 70 strikes the silica storage screen film either below the first crossover point or above the second crossover point of the secondary emission ratio curve for the film material. Under these conditions the secondary emission ratio is less than unity and a negative charge pattern may be established on the storage screen 32 by input signals modulating the beam 70. In those areas where a negative charge has been established, the charge neutralizes the effects of the fluorescent screen's positive field. Thus, the low velocity electrons of the spray beam 56, in those areas, do not see the positive field and are reflected to the mesh collector screen 34 so that the display provided is dark writing on a light background.

*Erasing system*

Assuming that a polar coordinate type information presentation is desired, the structure illustrated in Figures 1 and 2 may be utilized to provide cyclical writing and erasure. The deflection signal source 74 produces sawtooth currents which periodically energize the deflection yoke 72. The deflection yoke 72 is rotated about the tube neck 14 at some predetermined rate by a drive unit 78 mechanically coupled to the yoke by means of a gear box 80. Thus the writing beam 70 is radially deflected from a fiducial point to cyclically and progressively scan the storage target 32 in P. P. I. (plan position indicator) fashion. Input signals derived during a given deflection interval are applied to the writing gun control grid 64 by the input circuit 76 to modulate the intensity of the beam 70 and thereby establish a corresponding electrical charge pattern and bright display on the storage screen and on the fluorescent screen, respectively.

Referring particularly to Figure 2, it will be seen that if information has been written on the portion of the storage screen 32 in contact with section A of screen 30, next it is desirable to write information on screen section B. However, during the preceding 360° writing operation, previous information was written on section B. It therefore is necessary that such old data be erased in order that it may be replaced with up-to-date information. To this end, referring again to Figure 1, a switch 82 is provided having sections 82′, 82″, and 82‴, each switch section being rotated in synchronism, as indicated by the dash line 85, with the rotation of the deflection yoke 72. The timing of the switching mechanism is adjusted such that a short interval of time before writing is to commence on the storage insulator section in contact with screen section B, switch arm 83 of switch section 82′ makes contact with terminal B′ of the switch. The contact, thus instantaneously made, connects a source of potential 84 to trigger a monostable of "one-shot" multivibrator 86. A positive-going output signal 87 is derived from the multivibrator which initiates conduction in a cathode follower 88 normally biased to cut-off by a potential source 91. A similar positive going signal 89 is coupled from the cathode follower and is applied to screen section B of the storage tube 10 via a fan-shaped arm 90 of switch section 82‴ which is then in contact with terminal B‴ thereof. The positive-going signal, having an amplitude between viewing gun cathode potential and a high positive value, causes electrons from the spray beam 56 to strike the silica storage film 32 below its first secondary emission ratio curve crossover point to reestablish section B at a uniform potential. Simultaneously, disk-like switch section 82″ maintains the remaining wedge-shaped sections A, C, D, E, F, G, and H at potential of approximately minus 20 volts relative to ground.

Thus with section B of screen 30 at a uniform potential (i. e. erased), writing on the storage screen 32 may proceed. After new data has been written on the portion of the storage screen 32 in contact with section B of screen 30, and at a time slightly before writing is to commence on screen section C, switch sections 82′, 82″ and 82‴ operate to maintain sections A, B, D, E, F, G, and H at minus 20 volts with respect to ground and to apply an erasing pulse to screen section C. In accordance with the method described above it will be seen that such erasure of old data always is cyclically achieved slightly in advance of the writing of new information and an up-to-date information display is provided. The number of screen sections (A through H in the instant example) employed for erasure in the storage tube of the invention may be any convenient number and primarily is dictated by practicality in tube fabrication and the requirements of the particular system wherein the tube and erasing system are utilized.

The erase interval may be controlled by controlling the multivibrator pulse duration and the extent of erasure may be controlled by suitable adjustment of the amplitude of the erasing pulse. The pulse duration may be controlled, for example, by varying the circuit constants in the charging circuit of the one-shot multivibrator 86 while the pulse amplitude may be controlled by adjustment of the movable arm 92 of a potentiometer 94 across the voltage source 95 in the anode circuit of the cathode follower 88.

In Figure 3 there is shown a storage target assembly 97 which may be utilized in the tube of Figure 1 to replace target assembly 27. Target assembly 97 is adapted for use in systems wherein a rectangular coordinate display is desired. The target assembly 97 comprises an insulating frame 96 upon which a plurality of conductors 98 are suspended to form a line screen. In contact with each wire of the line screen is a storage film of insulating material 100, shown in detail in Figure 4, which, as mentioned previously, may be formed from silica, magnesium fluoride, or other suitable materials. The screen thus fabricated may be "sectioned" by electrically connectting the screen wires into groups of predetermined equal numbers of wires. With a rectilinear type deflection of the direct-view tube writing beam 70, it will be seen that old information stored on a given section (comprising one group of joined wires) of the silica line screen may be erased by pulsing the wires in contact therewith just prior to the writing of new data on said given screen section. Thus information may be cyclically and progressively written and erased in a manner substantially the same as has been described above with reference to the polar coordinate display.

What is claimed is:

1. An electron discharge device target assembly comprising an electron permeable screen formed of insulating material for storing a desired electrical charge pattern, and a plurality of conductive units insulated from each other and in contact with one surface of said screen, each of said conductive units being capable of controlling the electric potential of the screen portion in contact therewith.

2. An electron discharge device target assembly comprising, an electron permeable screen formed of insulating material for storing a desired electrical charge pattern, and a plurality of coplanar conductive units insulated from each other and in contact with one surface of said screen, each of said coplanar units being capable of controlling the electric potential of the screen portion in contact therewith.

3. An electron discharge device target assembly comprising, a first electron permeable mesh screen, a second electron permeable mesh screen spaced from said first screen formed of insulating material for storing a predetermined electrical charge pattern, and a plurality of coplanar wedge shaped conductive units insulated from each other intermediate said first and second mesh screens and in contact with adjacent surfaces thereof, each of said coplanar wedge shaped units being capable of controlling the electric potential of the second mesh screen portion in contact therewith.

4. An electron discharge device target assembly comprising, an electron permeable conductive line screen having each line thereof insulated from the remaining screen lines, and a second electron permeable line screen comprising an insulating material having lines in contact with one surface of corresponding lines of said first line screen and for storing a desired electrical charge pattern, a predetermined number of adjacent lines of said conductive line screen being connected together to form a plurality of coplanar units each for controlling the electrical potential of the second mesh screen portion in contact therewith.

5. An electron discharge device comprising, an electron source, a fluorescent screen spaced from said source, a storage insulator positioned between said source and said fluorescent screen, and a plurality of conductive units in contact with the surface of said insulator adjacent said fluorescent screen said units being insulated from each other and individually capable of controlling the flow of electrons from said source to said fluorescent screen.

6. An electron discharge device comprising, an electron source, a fluorescent screen spaced from said source, an electron permeable storage insulator positioned between said source and said fluorescent screen for storing a desired electrical charge pattern, and a plurality of electron permeable conductive units insulated from each other and adjacent said permeable storage insulator, each of said conductive units being in contact with the surface of said insulator adjacent said fluorescent screen and individually capable of controlling the flow of electrons from said source to said fluorescent screen.

7. An electron discharge device comprising, an electron source, a fluorescent screen spaced from said source, an electron permeable screen positioned between said source and said fluorescent screen closely spaced from said fluorescent screen and for storing a desired electrical charge pattern, and a plurality of electron permeable coplanar conductive units insulated from each other and in contact with one surface of said permeable screen, each of said coplanar units being individually capable of controlling the flow of electrons from said source to said fluorescent screen.

8. An electron discharge device comprising, an electron source, a fluorescent screen spaced from said source, an electron permeable mesh screen positioned between said source and said fluorescent screen closely spaced from said fluorescent screen and for storing a desired electrical charge pattern, and a plurality of coplanar wedge shaped conductive units insulated from each other and in contact with one surface of said screen, each of said coplanar wedge shaped units being capable of controlling the electrical potential of the screen portion in contact therewith to control the flow of electrons from said source to said flourescent screen.

9. An electron discharge device comprising, an electron source, a fluorescent screen spaced from said source, an electron permeable conductive line screen mounted between said source and said fluorescent screen and closely spaced from said fluorescent screen having each line thereof insulated from the remaining screen lines, and a second electron permeable line screen comprising an insulating material having lines in contact with one surface of corresponding lines of said first lines screen and for storing a desired electrical charge pattern, a predetermined number of adjacent lines of said conductive line screen being connected together to form a plurality of coplanar units each for controlling the electron potential of the second line screen portion in contact therewith to control the flow of electrons from said source to said fluorescent screen.

10. A signal storage system comprising a storage tube having means for providing a beam of electrons and a storage target assembly including an insulating storage member and a plurality of individually insulated conductive units, means for substantially linearly deflecting said beam across said storage member to write data thereon, and means associated with and responsive to operation of said deflection means for changing the potential of each of said conductive units from a known first potential level to a known second potential level to cyclically erase data stored on said storage target unit by unit.

11. A signal storage system comprising, a storage tube having means for providing a beam of electrons and a storage target assembly including an insulating storage member and a plurality of individually insulated conductive units, means for substantially linearly deflecting said beam across said storage member, means effective during said deflections to modulate said beam to establish a desired electrical charge pattern on said target, and means associated with and responsive to operation of said deflection means for changing the potential applied to each of said conductive units from a known first potential level to a second known potential level to cylically erase data stored on said storage target unit by unit.

12. A system as claimed in claim 11 including means for controlling the duration of said periodically applied potential.

13. A system as claimed in claim 11 including means for controlling the amplitude of said periodically applied potential.

14. A system as claimed in claim 12 including means for controlling the amplitude of said periodically applied potential.

15. A signal storage system comprising, a storage tube having means for providing a beam of electrons, a storage target including a plurality of individually insulated conductive units, and a fluorescent screen, means for deflecting said beam across said target to write data thereon, means effective during said deflections to modulate said beam to establish an electrical charge pattern on said target and a corresponding visual display on said fluorescent screen, means associated with said deflection means for changing the potential applied to each one of said conductive units from a known first potential level to a known second potential level to cyclically erase data displayed on said fluorescent screen.

16. A system as claimed in claim 10 including a fluorescent screen for providing a visual image in response to the charge pattern on said storage target.

References Cited in the file of this patent

UNITED STATES PATENTS

| | | |
|---|---|---|
| 2,185,693 | Mertz | Jan. 2, 1940 |
| 2,276,359 | Von Ardenne | Mar. 17, 1942 |
| 2,462,896 | Ransom | Mar. 1, 1949 |
| 2,501,791 | Silverman | Mar. 28, 1950 |
| 2,513,743 | Rajchman | July 4, 1950 |
| 2,531,600 | Barney et al. | Nov. 28, 1950 |
| 2,532,339 | Schlesinger | Dec. 5, 1950 |
| 2,604,606 | Rajchman | July 22, 1952 |
| 2,656,485 | Page | Oct. 20, 1953 |
| 2,704,328 | Wolkstein | Mar. 15, 1955 |

UNITED STATES PATENT OFFICE
CERTIFICATE OF CORRECTION

Patent No. 2,847,610                      August 12, 1958

Harold Borkan

It is hereby certified that error appears in the printed specification of the above numbered patent requiring correction and that the said Letters Patent should read as corrected below.

Column 2, line 65, beginning with "a second or" strike out all to and including "neck 14 is" in line 67, and insert instead the following --

> envalope neck 12 is an electron gun 16, hereinafter
> referred to as the "viewing gun". Within neck 14 is
> a second or "writing" electron gun 18 for providing a column 3, line 67, for "lectrode" read -- electrode --; column 6, line 39, for "connectting" read -- connecting --.

Signed and sealed this 11th day of November 1958.

(SEAL)
Attest:

KARL H. AXLINE
Attesting Officer

ROBERT C. WATSON
Commissioner of Patents

Disclaimer 2,847,610.—*Harold Borkan*, Franklin Township, Somerset County, N.J. DIRECT-VIEW ELECTRICAL STORAGE TUBE AND ERASING SYSTEM THEREFOR. Patent dated Aug. 12, 1958. Disclaimer filed Dec. 24, 1959, by the assignee, *Radio Corporation of America*.

Hereby enters this disclaimer to claim 10 of said patent.

[*Official Gazette February 9, 1960.*]